US006962271B2

(12) United States Patent
Gregson, Jr.

(10) Patent No.: US 6,962,271 B2
(45) Date of Patent: Nov. 8, 2005

(54) DISPENSING SYSTEM FOR RETURNABLE BULK CONTAINERS

(75) Inventor: Kenneth Robert Gregson, Jr., Loveland, OH (US)

(73) Assignee: Sertapak, Inc., Woodstock (CA)

( * ) Notice: Subject to any disclaimer, the term of this patent is extended or adjusted under 35 U.S.C. 154(b) by 0 days.

(21) Appl. No.: 10/979,753

(22) Filed: Nov. 3, 2004

(65) Prior Publication Data

US 2005/0115982 A1 Jun. 2, 2005

Related U.S. Application Data

(60) Provisional application No. 60/516,288, filed on Nov. 3, 2003.

(51) Int. Cl.[7] .................................................. B67D 5/64

(52) U.S. Cl. ....................... 222/166; 222/167; 222/168; 248/130; 248/131; 248/132

(58) Field of Search ................................ 222/165–168, 222/461; 248/130–132; 414/420

(56) References Cited

U.S. PATENT DOCUMENTS 2,673,009 A * 3/1954 Hawkins ..................... 414/420
6,523,723 B1 * 2/2003 Ekstrom ..................... 222/165
6,715,647 B1 * 4/2004 Ivins .......................... 222/166

* cited by examiner

*Primary Examiner*—Philippe Derakshani
(74) *Attorney, Agent, or Firm*—Jones, Tullar & Cooper, P.C.

(57) ABSTRACT

A dispensing system for returnable bulk shipping containers and more particularly to a apparatus and method for selectively emptying the contents of bulk containers which, when emptied, can be returned to the supplier for refilling. The apparatus comprises a hoist having vertical lift capability. A rotator provided on the hoist provides horizontal rotation capability to a container press. A funnel cap is provided with the container press which is configured to replace the cover of the container, thereby retaining any structural integrity afforded by the cover. The funnel cap includes a selectively operable valve. The funnel cap operates in conjunction with a platen which is used to initially support the container in its upright position. The funnel cap and platen are movable away from one another to enable containers to be inserted or removed therefrom. The funnel cap and platen are movable toward one another to enable a container to be engaged and retained therein. The funnel cap and platen exert sufficient force on the container such that during lift and rotation of the container, it will not fall out. Once inverted, the contents of the container will have been gravitationally fed into the funnel. The valve in the funnel may then be selectively operated to dispense discreet quantities of flowable material.

21 Claims, 10 Drawing Sheets

DISPENSING SYSTEM FOR RETURNABLE BULK CONTAINERS

This application claims the benefit of U.S. Provisional Application No. 60/516,288 filed Nov. 3, 2003.

FIELD OF THE INVENTION

The invention relates to dispensing systems for returnable bulk shipping containers and more particularly to a apparatus for selectively emptying the contents of bulk containers which, when emptied, can be returned to the supplier for refilling.

BACKGROUND OF THE INVENTION

There are a number of different types of bulk shipping containers in use today. Some of these containers include:

- Paper, paperboard or cardboard boxes on pallets made of wood or other materials;
- Smaller boxes, generally of paper, with or without bags or liners inside; and
- Hard bins, for example Ropak™ and Linpac™ brand containers.

Although disposable containers make up a significant proportion of the market, a returnable solution offers both economic and ergonomic advantages. These these markets are showing signs they are ready to convert to returnables, and there is a trend driven by both economic and ergonomic factors.

Containers for bulk fluid or granulated materials require systems for dispensing the materials at the point of use. Presently, containers are emptied by corner or side tear-away cutting, manual dump (of smaller boxes) or are side dumped, which methods do not permit direct flow control of the material. Where flow control is required, the containers must be emptied into metering devices, requiring additional equipment and material handling steps. Furthermore, these methods permit the materials to be exposed to the environment during dumping and may result in dust or residue being generated from the movement of the bulk material.

Some bulk containers include a hopper mechanism or a built-in dispensing port/valve but such devices add to the complexity and cost of the container and can be inconvenient or space-consuming for knock-down or disassemblable returnable containers.

By providing the dispensing mechanism in association with the emptying apparatus, the containers can be made more cost and volume efficient.

Such bulk containers have been developed which comprise a sleeve, effectively forming the sidewalls of the container, which are sandwiched between a pair of pallets that form the top and bottom of the container. Such a container (as shown in FIG. 1) is described in Canadian Patent Application No. 2,358,261, published Apr. 4, 2003 and incorporated herein by reference. These containers can readily be broken down for storage or return as the top and bottom pallets are removable and preferably nestable and the sleeve is substantially flattenable or foldable. The sleeves may be made from multiply corrugated paper and/or plastic to suit the specific requirements of the material to be contained.

These containers have good compressive strength in the vertical direction as the containers themselves must be capable of being stacked. Generally, this strength not only comes from the sidewall structure but usually involves the manner by which the top and bottom pallets constrain the edges of the sidewalls. However, because of the foldable nature of the sidewalls, these containers can be difficult to empty since once the top is removed, lateral forces on the walls can cause them to fold readily out of shape, making emptying by tipping or inversion problematic.

SUMMARY OF THE INVENTION

A funnel cap is provided which is configured to replace the cover of the container, thereby retaining any structural integrity afforded by the cover. The funnel cap includes a selectively operable valve. The funnel cap operates in conjunction with a platen which is used to initially support the container in its upright position. The funnel cap and platen are movable away from one another to enable containers to be inserted or removed therefrom. The funnel cap and platen are movable toward one another to enable a container to be engaged and retained therein. The funnel cap and platen exert sufficient force on the container such that during lift and rotation of the container, it will not fall out. Once inverted, the contents of the container will have been gravitationally fed into the funnel. The valve in the funnel may then be selectively operated to dispense discreet quantities of flowable material. In general, by providing the dispensing mechanism in association with the emptying apparatus, the containers can be made more cost and volume efficient.

According to one aspect of the invention, there is provided apparatus for dispensing of flowable material from bulk containers, the containers having sidewalls disposed between a lower pallet and a cover, comprising:

- a container press, comprising: a platen on which the lower pallet of the container is positionable; a funnel cap adapted to replace the cover of the container; a valve in the funnel cap; and translation means for permitting relative movement of the funnel cap towards and away from the platen; and
- rotation means for rotating said container press about a substantially horizontal axis.

Preferably, the apparatus includes a lift mechanism for raising and lowering the container press.

According to another aspect of the invention, there is provided a method of controllably dispensing flowable product from a bulk container of the type having sidewalls disposed between a lower pallet and a removable cover, comprising the steps of:

- providing a funnel cap configured similarly to the cover so as to be a replacement therefor, said funnel cap having a selectively operatable valve therein;
- providing a platen generally opposing said funnel cap;
- placing the container on a platen;
- moving the funnel cap relative to the platen to engage the upper edges of the sidewalls of the container within the funnel cap;
- exerting a predetermined pressure on the container by said platen and funnel cap which will be sufficient to prevent the container from falling out from between said platen and funnel cap when rotated;
- rotating said platen and funnel cap to invert the container and permit the contents of the container to flow into the funnel cap;
- operating said valve to dispense an amount of flowable product.

These and other features of the invention will become apparent from the following description and drawings.

BRIEF DESCRIPTION OF THE DRAWINGS

FIGS. 10–11 illustrate a second embodiment of the dispensing system, wherein:

DETAILED DESCRIPTION OF THE INVENTION

Figure 1:
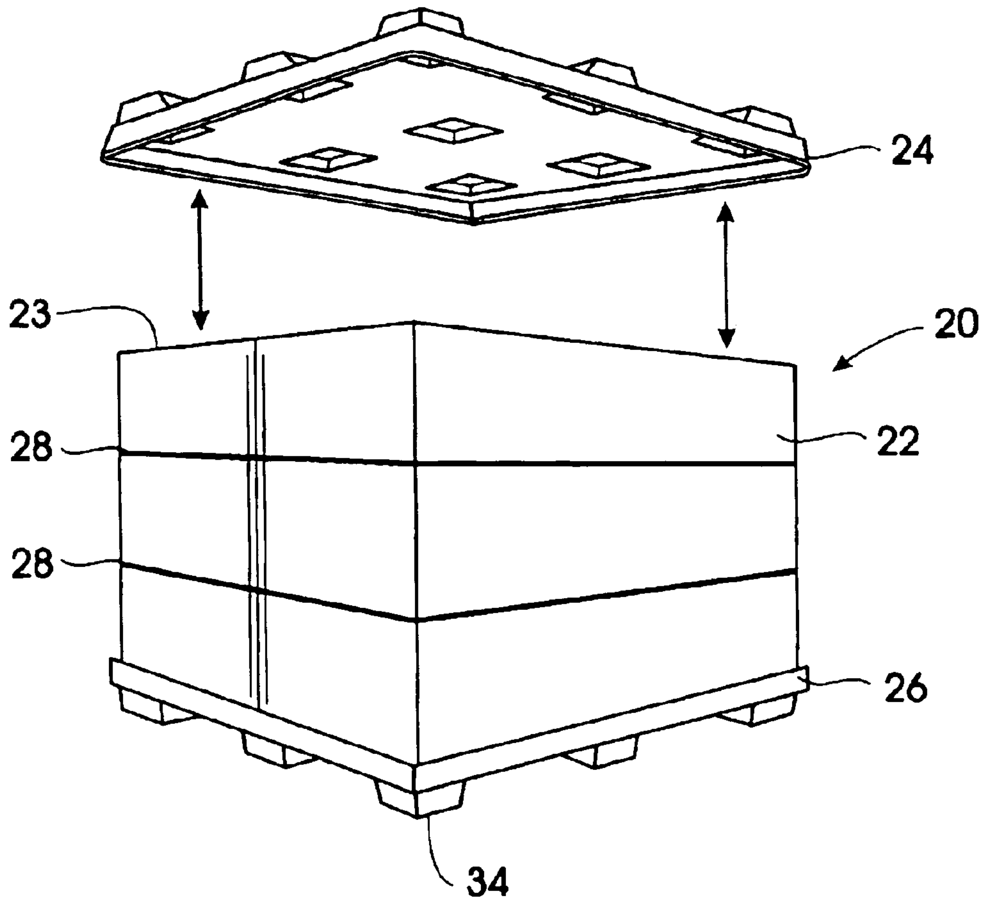
FIG. 1 is a front perspective view of an exemplary bulk returnable container.

Referring to FIG. 1, the exemplary container/pack 20 in this case consists of a one-piece, tube-shaped, foldable sleeve 22 adapted to be positioned within a pair of thermoformed pallets 24,26 which form the top and bottom, respectively, of the container 20. The container may be double-banded with bands 28 for added strength during handling and transit. Typically, such containers have a footprint of 39×48"; 45×48"; or 48×48" OD, a sleeve height of 45" and, when loaded, can weigh upwards of 500 lbs.

Figure 2:
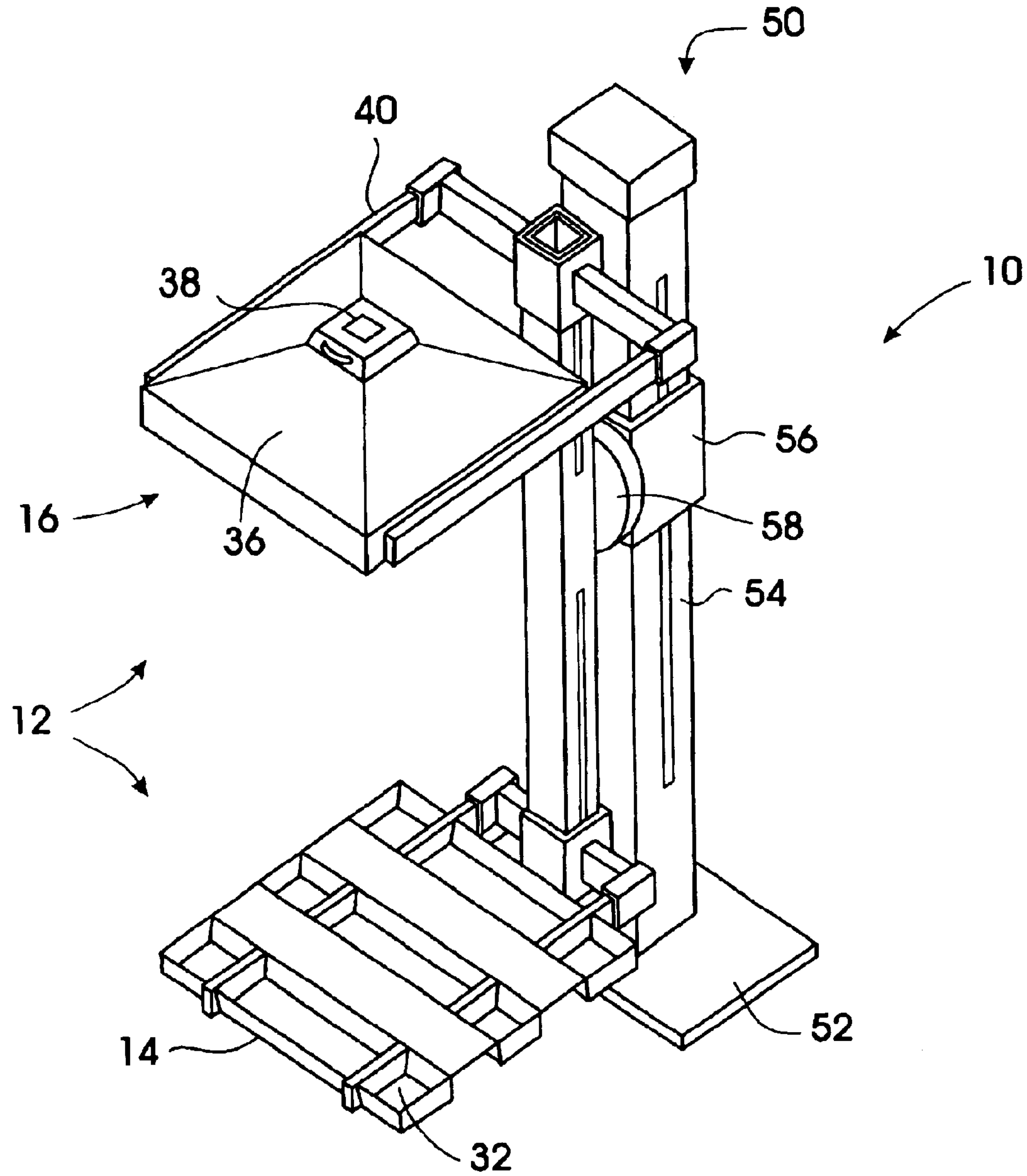
FIG. 2 is a perspective view of one embodiment of the dispensing system according to the invention.

The dispensing system 10 is shown in FIG. 2. At the heart of the dispensing system 10 is the container press 12 which comprises a lower platen 14 and an upper hopper cap 16 movable relative toward and away from one another. While the lower platen 14 may be flat, it is preferably configured to accept and accommodate (stack with) the entire range of incoming pallet configurations. For example, the platen 14 shown in FIG. 2 is provided with wells 32 which accommodate feet 34 of the container (as shown in FIG. 1). Such an arrangement serves to limit or prevent relative lateral movement between the container 20 and the lower platen 14.

The funnel cap 16 contains an angled (preferably about 35°) hopper-style funnel 36, typically made of cut & weld aluminum sheet, and a valve system 38 at its apex. The valve is normally in its "closed" position. The valve may be of the iris-type and may include flow monitoring sensors or meters for accurate dispensing of discreet amounts of the flowable material. Preferably, the valve is "soft" on edges, so as not to crush the product when the valves is closed to interrupt the flow. The valve system 38 may be manually operated or automatically controlled.

Figure 7:
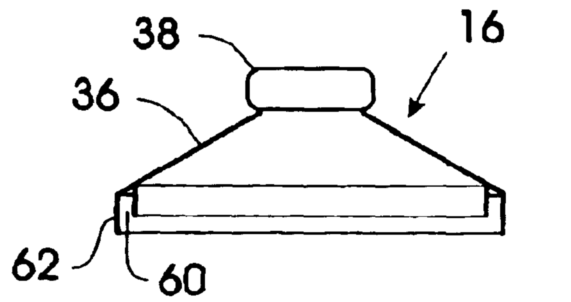
FIG. 7 is a cross-section of an exemplary hopper cap.
Figure 8A:
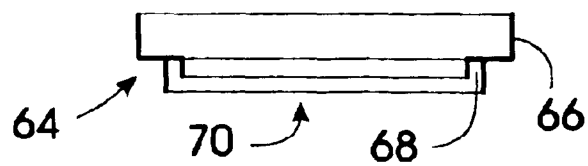
FIG. 8A is a cross-section of an adaptor which can be used with the hopper cap to fit containers of different size.
Figure 8B:
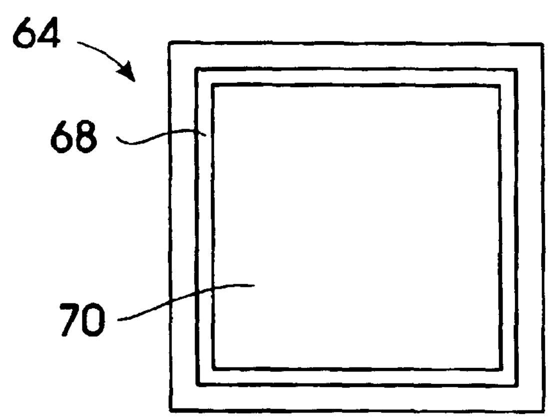
FIG. 8B is a bottom plan view of the adapter as shown in FIG. 11A.
Figure 9:
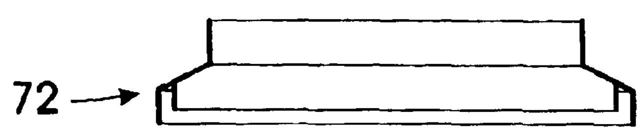
FIG. 9 is a cross-section of an adapter which can be used to accommodate containers larger than would otherwise fit within the funnel cap.

Like the platen 14, the funnel cap 16 is configured to accommodate the sleeve's upper edge 23 (see FIG. 1) in a similar manner as would its upper pallet/cover 24. In this regard, different interchangeable funnel caps 16 could be provided to accommodate different containers or the funnel cap 16 could be configured to accept a variety of different containers expected to be used. FIG. 7 shows a funnel cap 16 in cross-section. The funnel cap 16 may be provided with a channel 60 inside flange 62 adapted to accommodate the upper edge 23 of container 20 and to prevent it from relative movement with respect to the funnel cap 16. The shape (in plan view) and width of the channel 62 can be predetermined to suit the container(s) being emptied. It is also possible to employ an intermediate stage adaptor 64 as shown in FIGS. 8A–B between funnel cap 16 (FIG. 7) and container 20. A variety of configurations for the adapter 64 are available to suit specific container requirements. In the simple example shown, the adapter 64 includes a flange 66 which may be connectable to the funnel cap 16 by way of flange 62 and suitable fasteners (not shown) and/or may be accommodated within channel 60 of funnel cap 16. The adapter 64 has a similar channel 68 for receiving the upper edge 23 of container 20. While the adapter 64 shown in FIGS. 8A–B illustrates adapting to a smaller size container and thus has a smaller aperture 70, it will be appreciated that an adapter 72 may be provided (see FIG. 9) which can interface between a larger container than would otherwise be accommodated by funnel cap 16.

Figure 3B:
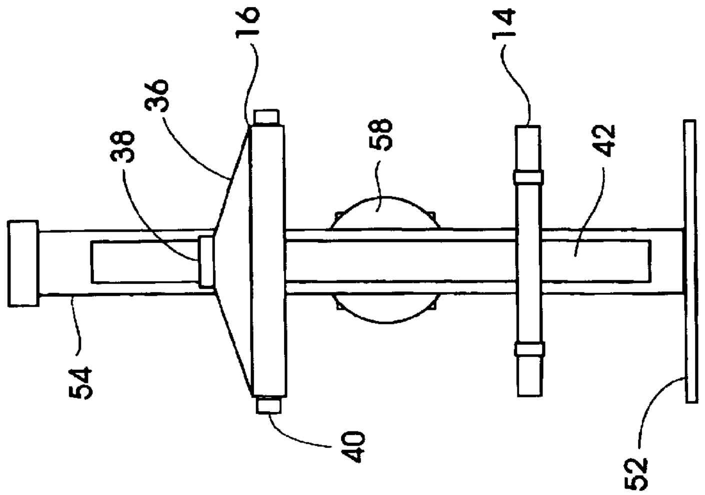
FIG. 3B is a front elevational view of the dispensing system of FIG. 3A.
Figure 3A:
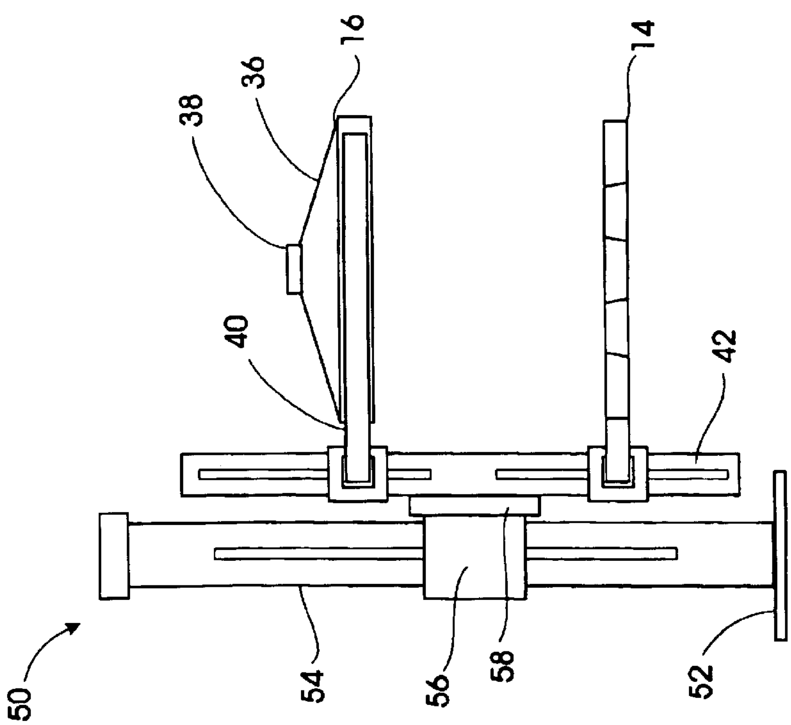
FIG. 3A is a left side elevational view of the dispensing system of FIG. 2 showing the lower platen and funnel cap generally in the position they would be in if they were closed about a container.

The funnel cap 16 is mounted within the funnel cap support 40 which is mounted on central arm 42 of the container press 12 (as seen best in FIG. 3A). The lower platen 14 is also connected to the central arm 42. The lower platen 14 and the funnel cap support 40 are movable relative to one another along the central arm 42 so that the funnel cap 16 can be positioned on the opened top of a container placed on the lower platen 14. Either the funnel cap support 40 or the lower platen 14 can be movable to provide the necessary relative movement therebetween or both can be moved. The movement can be power operated or hydraulically assisted.

The central arm 42 is rotatable with respect to the remainder of the dispensing system's support 50 to enable the container to be inverted once clamped between the funnel cap 16 and the lower platen 14. The support 50 may be of any suitable type which can function to lift and rotate the central arm 42, and hence the container press 12. In the embodiment shown in FIGS. 1–6, the support 50 comprises a base 52 having a mast 54 to which an elevator 56 is movable therealong. The elevator 56 includes a rotation mechanism 58 to which the central arm 42 of the container press 12 is mounted. Preferably, the components are arranged and positioned (or they are positionable) so that rotation of the container occurs substantially about its center of mass to minimize extraneous moments.

Figure 4:
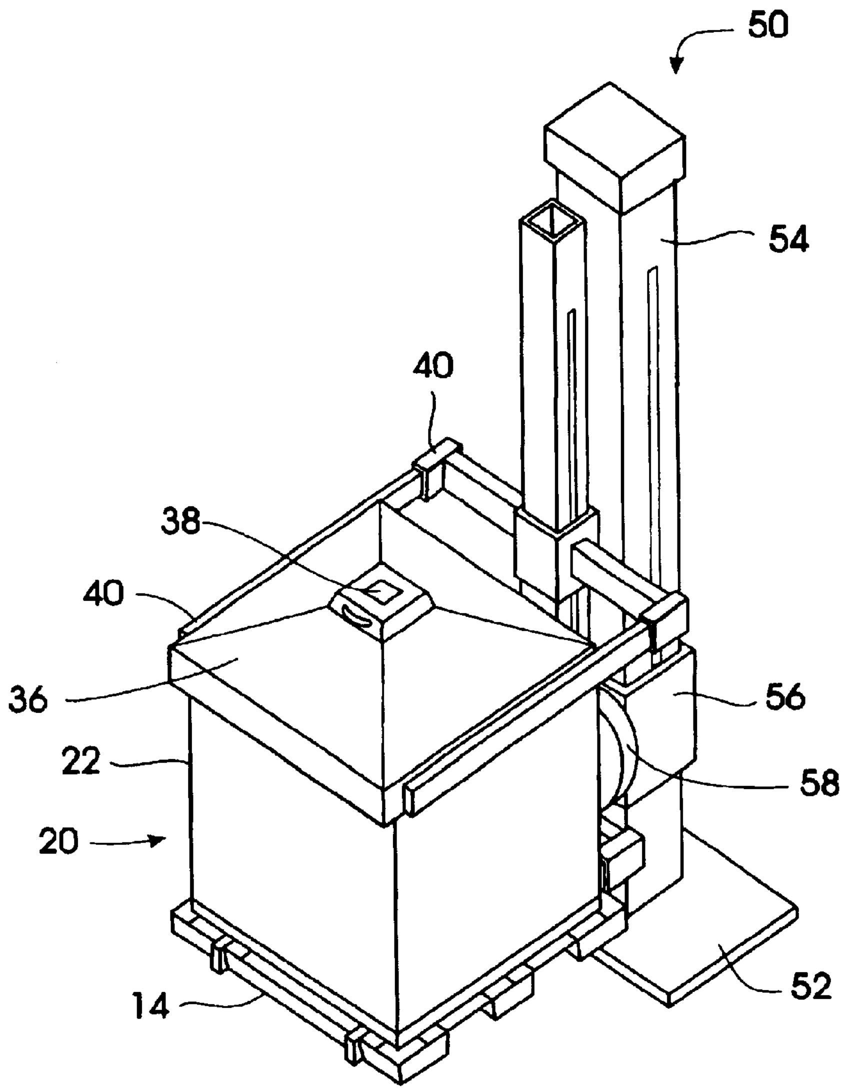
FIG. 4 is a perspective view of the dispensing system showing a container accommodated therein in its upright position.
Figure 6:
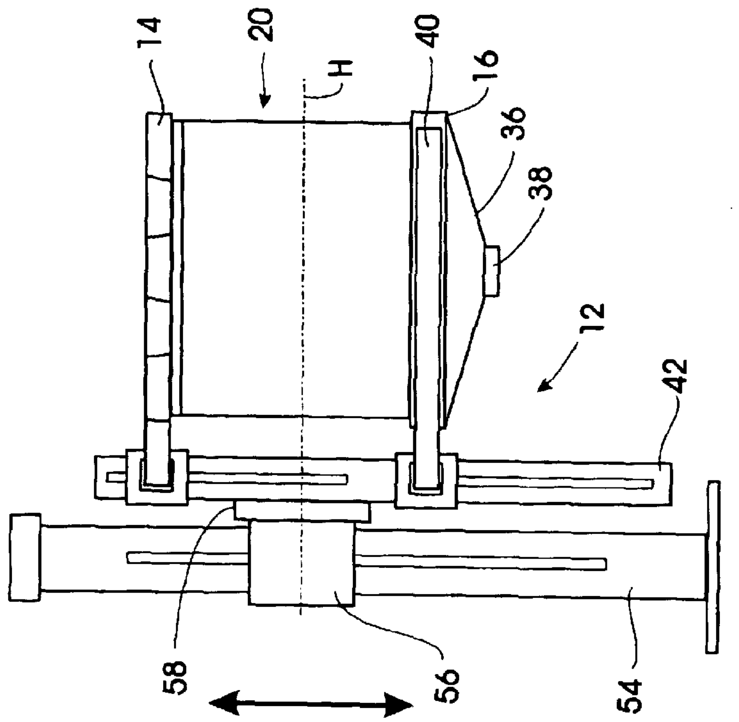
FIG. 6 is a left side elevational view illustrating the container in its dispensing position after having been lifted and rotated (inverted)
Figure 5:
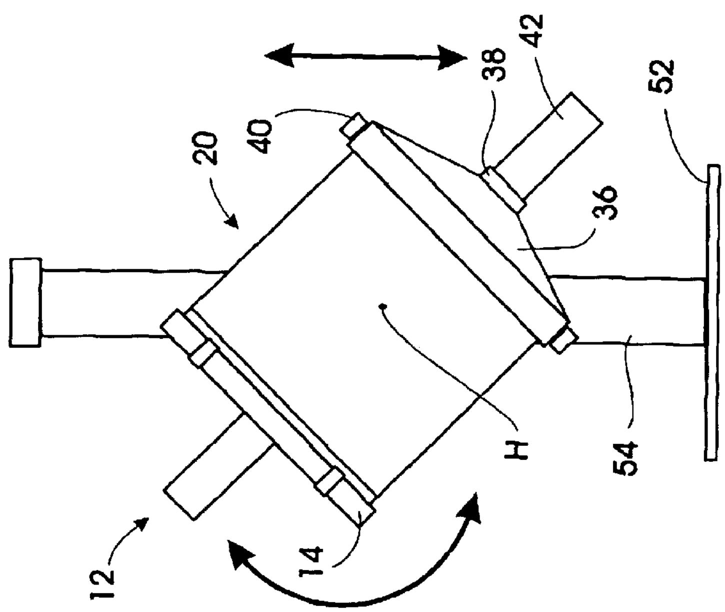
FIG. 5 is a front elevational view illustrating the initial rotation and/or lift of the container in the dispensing system.

The dispensing operation is shown generally in FIGS. 4 to 6. Incoming, loaded containers 20 are fork-lifted to the product system area and the container 20 is placed onto the lower platen 14. Bands 28, if provided, are cut and the top pallet 24 is removed (although this step may be performed prior to placing the container 20 on the platen 14).

The funnel cap support 40 and the funnel cap 36 in this case are slidable vertically along the central arm 42 and can be lowered to engage the sleeve 22. The descending movement is power-assisted, and may be automatically limited at a predetermined level of compression (grip) of the sleeve.

At this point, optional side supports (not shown) may be mounted around the sleeve 22 and between the lower platen 14 and funnel cap support 40, to counter the side-wall effect of the moving product during the rotation phase.

Depending on the height at which the container press 12 is disposed when the container 20 is vertically "clam-shelled" between the funnel cap 36 and the lower platen 14, it may be necessary to operate the elevator 56 to lift the container press 12 to a safe height off the floor. The "clamped" container 20 may then be rotated around a horizontal axis H through 180 degrees, as seen in FIG. 5, by operation of the rotation mechanism 58. The rotation axis H is situated close to the center of gravity of the combined load to minimize stress.

The rotational movement continues until the funnel cap 16 side reaches the lowest point, as seen in FIG. 6, and the (closed) valve 38 is pointing downward. The container press 12 may then be raised or lowered along the mast 54, if necessary, so as to position the valve 38 at the appropriate height.

The funnel 36 and the valve system 38 are by now loaded with product and the valve 38 itself can be opened to the desired extent, to start releasing product gravitationally. A proper conveyor system or recipient vessel is obviously placed under the funnel cap 16 at this point.

The flow of product can be interrupted and resumed at any time through operation of the valve 38. The valve actuator may be manual, or could be also powered.

Once the container 20 is empty, the container press 12 can be rotated by means of the rotation mechanism 58 back to its initial upright position while the elevator 56 descends to its initial level, if required. The funnel cap support 40 is moved upward and the container sleeve and bottom pallet assembly is now removed from the platen 14. The optional side supports are also removed or retracted, if installed in the first place. The top and bottom pallets 24,26 and the folded sleeve 22 can be stored for the return trip.

As indicated above, the lift/rotation portion of the dispensing system design may vary. The system shown in FIGS. 1–6 has a single-mast whose base is floor bolted and which includes a power elevator and power or manual rotator. A double mast system with the same features could also be provided. Some foundation work may be needed for permanently mounted versions. For added flexibility, a portable or mobile lift/rotator could be provided on casters or rollers and may include a double "A" or double "H" frame with power lifting and manual or assisted rotation. The power systems can be hydraulic or electric, or mixed with electrical and/or hydraulic oil and compressed air having to be supplied (via conventional systems) as required. Engineering, handling and safety certifications may be required for this lifting device, as local and regional regulations apply.

Figure 10A:
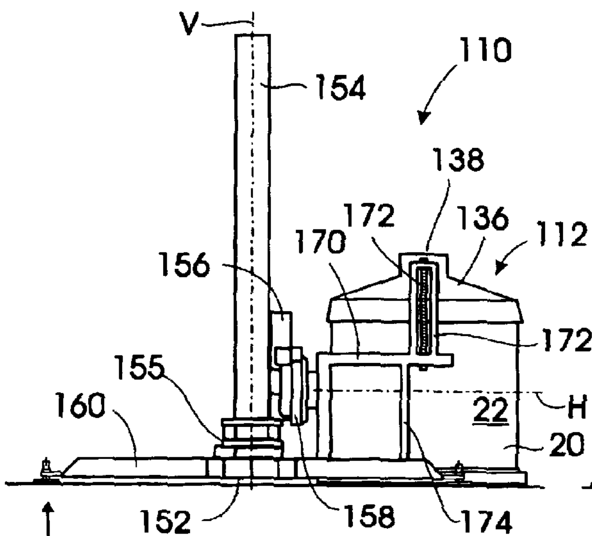
FIG. 10A is a side elevational view of the alternate dispensing system showing the container accommodated therein in its upright, inlifted position.
Figure 10B:
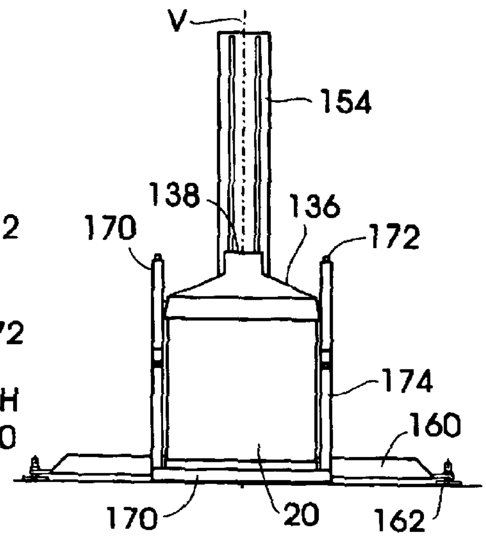
FIG. 10B is a front elevational view of the dispensing system as shown in FIG. 10A.
Figure 10D:
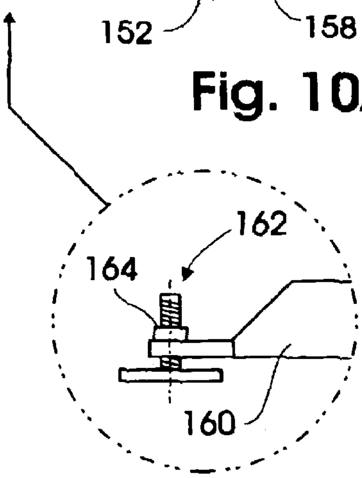
FIG. 10D is a detail of the outrigger foot as shown in FIG. 10A.
Figure 10C:
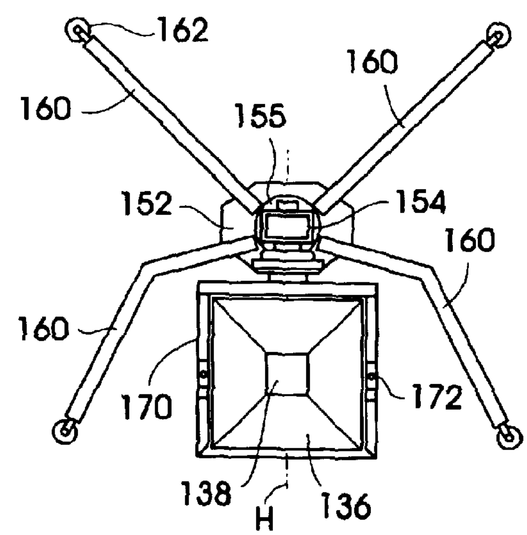
FIG. 10C is a plan view of the dispensing system as shown in FIG. 10B.

A second embodiment of the dispensing system 110 is illustrated in FIGS. 10A to 10D. In this preferred embodiment, the mast 154 is rotatably mounted for rotation about a generally vertical axis V on a base 152 via a power operated mechanism 155. Outrigger arms 160, shown best in FIG. 10C are provided on the base 152 for added stability. Each arm 160 is provided with a foot 162 which can be bolted or otherwise affixed to the floor or merely supported thereon. One or more of the feet 162 may be provided with a levelling mechanism 164 (as seen in detail in FIG. 10D) to permit the levelling of the system 110 or for accommodating irregular floor surfaces.

Returning to FIGS. 10A–10C, the elevator 156 is movable along (up and down) the mast 154 by hydraulic or other power-assisted means. The container press 112 is rotatably mounted to the elevator 156 for rotation about a substantially horizontal axis H by means of power operated rotator 158. The container press 112 includes a frame 170 within which the funnel cap 136 is movable such as by manual or power-operated screw threads 172. The frame 170 includes lateral side supports 174 which act to support sidewalls 22 of container 20 during rotation. The structure 176 in which the screw threads 172 are arranged may also provide support to the container sidewalls during rotation.

Figure 11B:
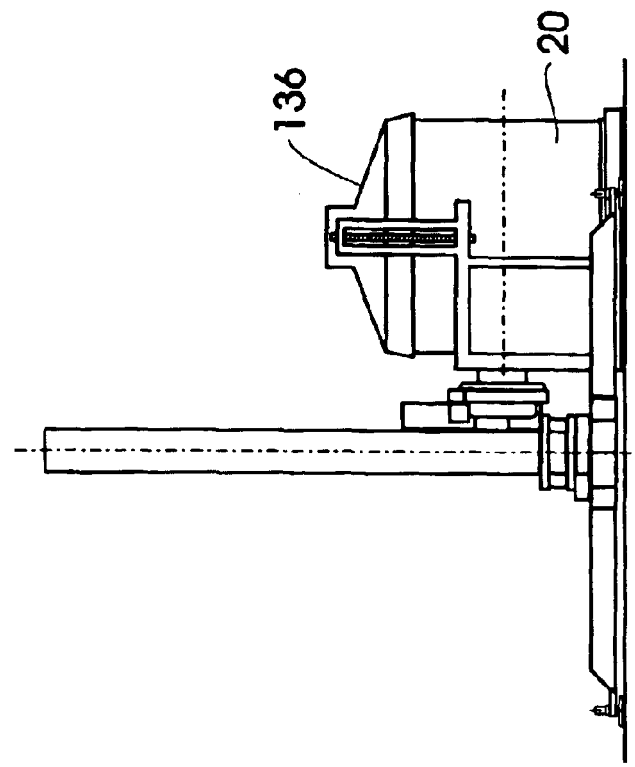
FIGS. 11A–11F illustrate the operation of the alternate dispensing system in left side elevational views.
Figure 11A:
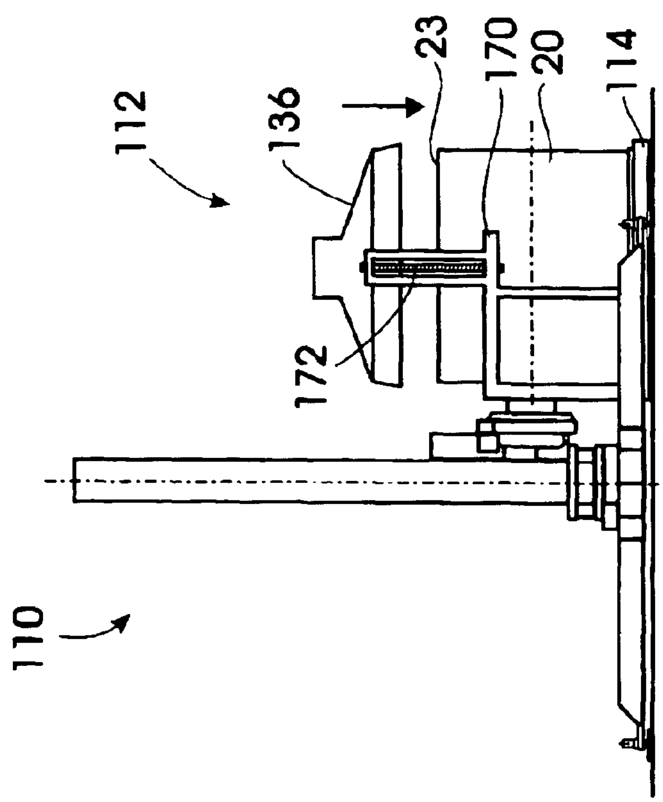

This dispensing system arrangement 110, shown in operation in FIGS. 11A–11F, permits the front loading of containers 20 within the frame 170 at a height suitable to the fork-lift. Once positioned on the lower platen 114, the upper pallet/cover (not shown) is removed from the container 20 and the power-operated screw threads 172 are operated as shown in FIG. 11A to lower the funnel cap 136 into engage the upper edge 23 of the container 20 as shown in FIG. 11B.

Figure 11D:
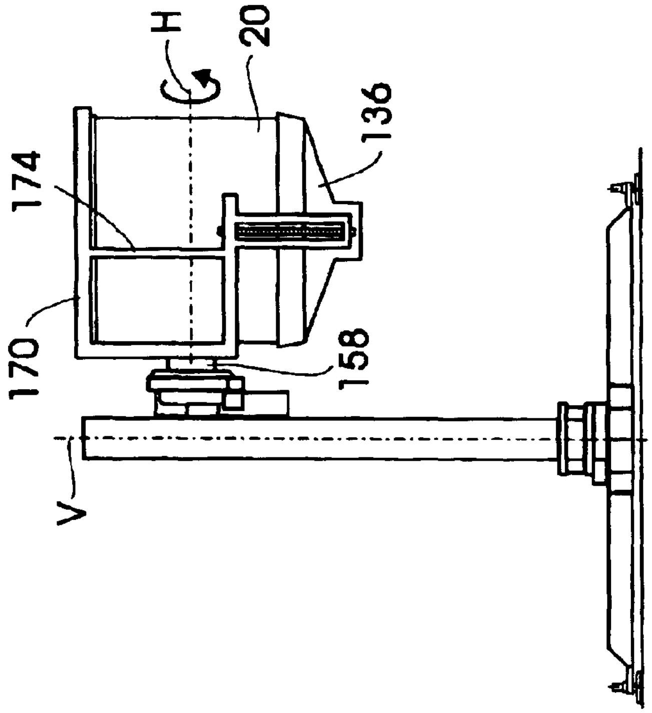
Figure 11C:
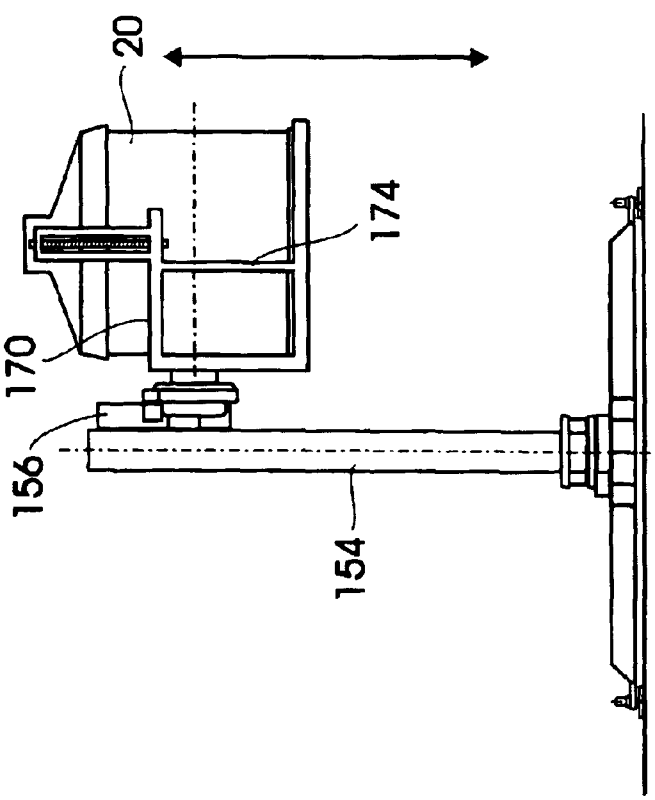
Figure 11F:
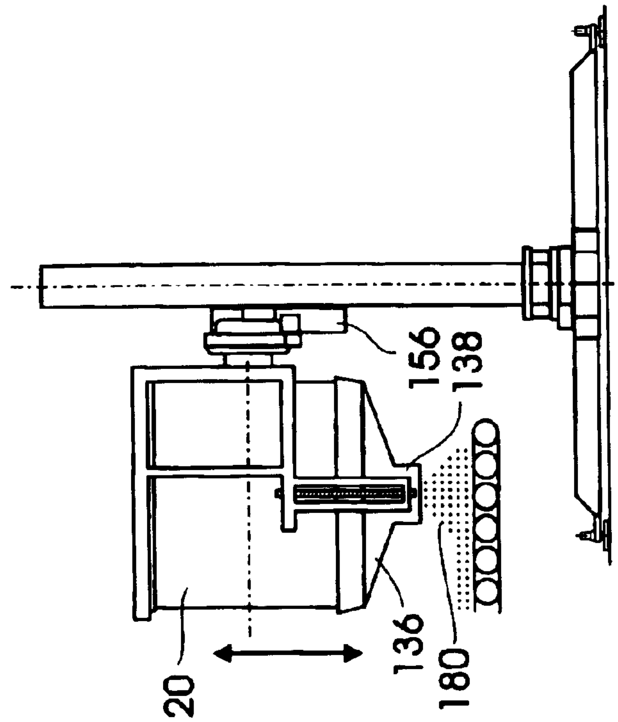
Figure 11E:
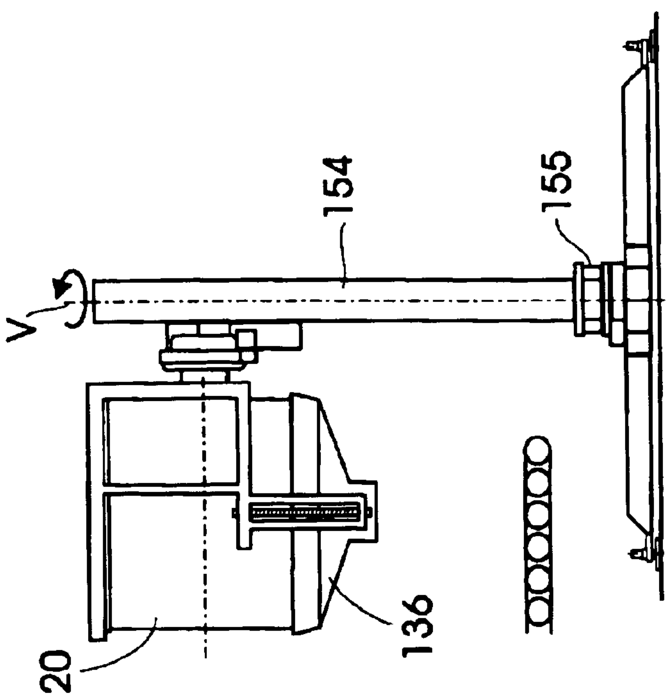

Should the height at which the container 20 was originally placed be insufficient to permit proper clearance from the floor during rotation, or if desired, the container 20 may then be lifted by operating elevator 156 as shown in FIG. 11C. The container 20 may then be inverted as shown in FIG. 11D by actuation of the rotator 158, which rotates the frame 170, funnel cap 136 and container 20 about a substantially horizontal axis H. The lateral side supports 174 of frame 170 permit the container to be laterally supported while being lifted and rotated. Depending on where the dispensing is to occur, the mast 154 may be rotated about a vertical axis V by operating the mast rotator 155 to permit the container 20 and hence the valve 138 of funnel cap 136 to be positioned at any desirable location about the mast 154 as shown in FIG. 11E. The height can be adjusted, if necessary, by operating elevator 156 to ensure the valve 138 is positioned at the appropriate height and the valve 138 is operated for controlled outflow of product 180 from the container 20, as shown in FIG. 11F.

The operation has been described sequentially to facilitate explanation. However, it is contemplated that the lift and rotation movements could be effected simultaneously and in various combinations to optimize positioning time.

While the foregoing description and referenced drawings have been framed in terms of emptying containers comprising a foldable sleeve arranged between a pair of pallets, the dispensing system should work equally as well with other container systems having a removable lid such as Ropak™ and Linpac™ brand containers and including disposable containers.

While there has been shown and described herein a dispensing system and method for controlled emptying of returnable containers, it will be appreciated that various modifications and or substitutions may be made thereto without departing from the spirit and scope of the invention.

I claim:

1. An apparatus for dispensing of flowable material from bulk containers, the containers having sidewalls disposed between a lower pallet and a cover, comprising:

a container press, comprising:

- a platen on which the lower pallet of the container is positionable;
- a funnel cap adapted to replace the cover of the container;
- a valve in the funnel cap; and
- translation means for permitting relative movement of the funnel cap towards and away from the platen; and rotation means for rotating said container press about a substantially horizontal axis.

2. An apparatus as claimed in claim 1, further comprising lift means for raising and lowering said container press.

3. An apparatus as claimed in claim 2, including a vertical mast along which said container press is raisable and lowerable by said lift means.

4. An apparatus as claimed in claim 3, further including rotator means for rotating said vertical mast about its vertical axis.

5. An apparatus as claimed in claim 1, wherein said platen is configured to accommodate a range of pallet configurations.

6. An apparatus as claimed in claim 5, wherein said platen includes means cooperative with the lower pallet of the container to resist relative lateral movement therebetween.

7. An apparatus as claimed in claim 1, wherein said funnel cap comprises a hopper-style funnel.

8. An apparatus as claimed in claim 1, wherein said funnel cap is adapted to accommodate upper edges of said sidewalls.

9. An apparatus as claimed in claim 8, wherein a channel is provided in said funnel cap which is engageable with the upper edges of said sidewalls.

10. An apparatus as claimed in claim 1, wherein an adaptor cooperates with said funnel cap to permit said funnel cap to replace the cover of various sizes of containers.

11. An apparatus as claimed in claim 1, further comprising means for automatically limiting the relative movement of the funnel cap towards the platen at a predetermined level of compression.

12. An apparatus as claimed in claim 1, wherein said container press further includes lateral side supports for supporting the sides of the container.

13. An apparatus as claimed in claim 1, further comprising a base which is affixable to a floor.

14. An apparatus as claimed in claim 1, further comprising a base from which a plurality of outrigger arms extend for increased stability.

15. An apparatus as claimed in claim 1, further comprising means for monitoring the amount of flowable material being dispensed.

16. A method of controllably dispensing flowable product from a bulk container of the type having sidewalls disposed between a lower pallet and a removable cover, comprising the steps of:

providing a funnel cap configured similarly to the cover so as to be a replacement therefor, said funnel cap having a selectively operatable valve therein;

providing a platen generally opposing said funnel cap;

placing the container on a platen;

moving the funnel cap relative to the platen to engage the upper edges of the sidewalls of the container within the funnel cap;

exerting a predetermined pressure on the container by said platen and funnel cap which will be sufficient to prevent the container from falling out from between said platen and funnel cap when rotated;

rotating said platen and funnel cap to invert the container and permit the contents of the container to flow into the funnel cap;

operating said valve to dispense an amount of flowable product.

17. A method as claimed in claim 16, further comprising the step of raising the container within the platen and funnel cap prior to or while inverting the container.

18. A method as claimed in claim 16, further comprising the step of raising or lowering the container within the platen and funnel cap after or while inverting the container to adjust the height at which the flowable product is dispensed.

19. A method as claimed in claim 16, further comprising the step of rotating the container, platen and funnel cap about a vertical axis.

20. A method as claimed in claim 16, further comprising the step of supporting the sidewalls of the container at least during inversion of the container.

21. A method as claimed in claim 16, wherein after a desired amount or all of the flowable product has been dispensed, rotating said platen and funnel cap to upright the container, moving the funnel cap relatively away from the platen to permit the sidewalls of the container and the pallet to be removed from therebetween.

* * * * *